UNITED STATES PATENT OFFICE.

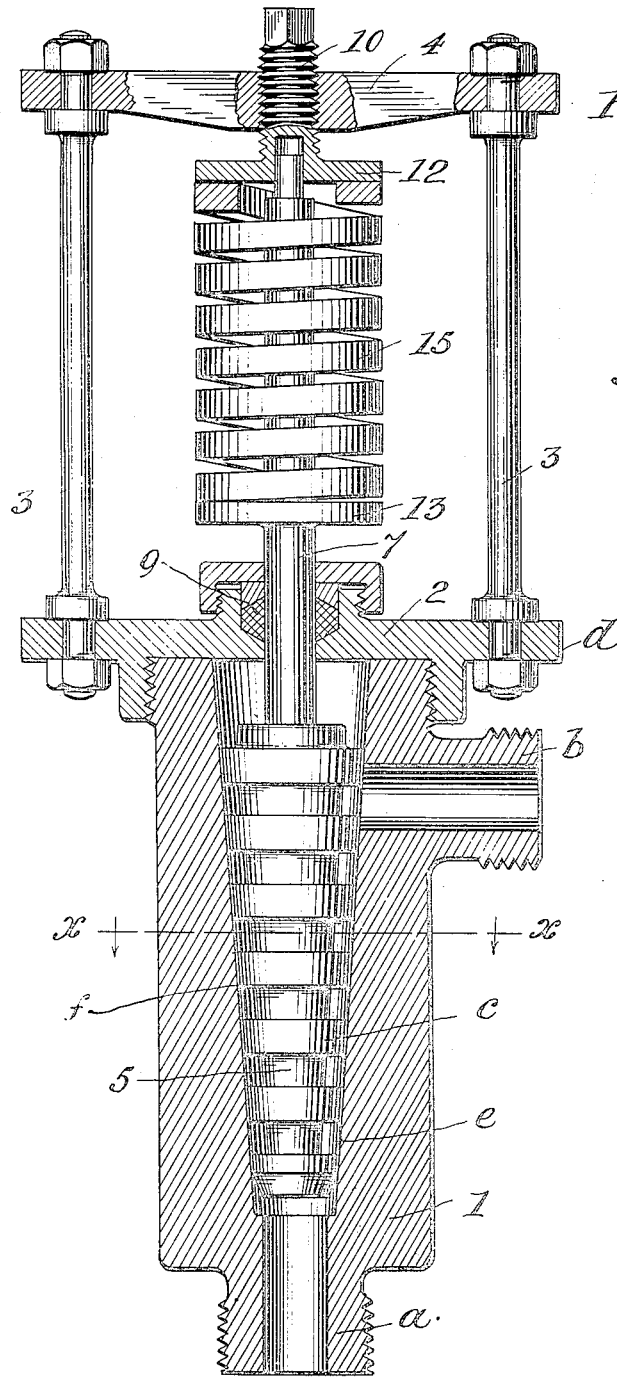
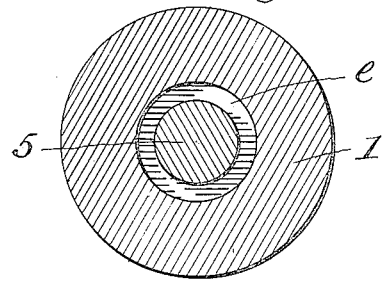
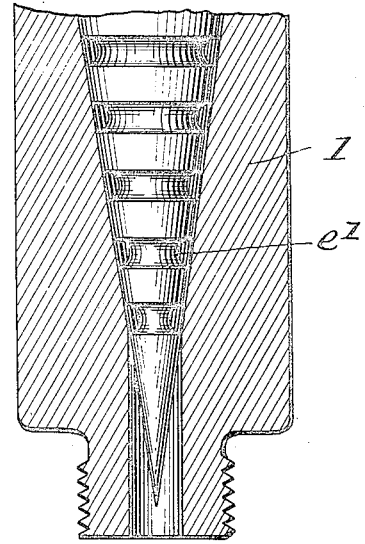

ASA B. GARDINER, JR., OF COCKEYSVILLE, AND RICHARD M. SHAFFER, OF BALTIMORE, MARYLAND.

EMULSIFYING APPARATUS.

1,042,781.   Specification of Letters Patent.   Patented Oct. 29, 1912.

Application filed March 29, 1912. Serial No. 687,001.

*To all whom it may concern:*

Be it known that we, ASA B. GARDINER, Jr., of Cockeysville, in the county of Baltimore, in the State of Maryland, and RICHARD M. SHAFFER, of the city of Baltimore and State of Maryland, have invented certain Improvements in Emulsifying Apparatus, of which the following is a specification.

This invention in common with others of its class, is for the purpose of breaking up the butter fat globules of milk and cream, into minute bodies, and with the other constituents of milk or cream, produce a uniform or homogeneous mechanical mixture usually termed an emulsion; and it consists in a peculiar construction of an apparatus for the above named purpose, as will hereinafter fully appear.

In the further description of the said invention which follows, reference is made to the accompanying drawing forming a part hereof and in which:—

Figure 1 is a longitudinal section of the improved emulsifying apparatus and Fig. 2 a section taken on the broken line $x$—$x$ in Fig. 1. Fig. 3 is a longitudinal section of a part of the apparatus, illustrating an alternative construction hereinafter described.

Referring now to the drawing, 1 is a shell having the nozzles $a$ and $b$ for the admission and the discharge, respectively, of the milk or cream. These nozzles are exteriorly threaded in order that the former can be connected to a pipe leading to a pump whereby the milk or cream to be treated is forced into the shell at great pressure, and the latter to a pipe leading to any suitable receptacle for the finished product. The shell 1 from its upper end to near its bottom, is conically bored, or in other words provided with a smooth conical surface.

2 is a bonnet screwed to the upper end of the shell. Extending from the circumference of the bonnet are lugs $d$, which are bored to receive the lower ends of the standards 3 to which cross bar 4 is fastened.

5 is a movable plug of frusto-conical form situated in the shell and provided with a multiplicity of annular grooves $e$ which are preferably equally spaced. The edges $f$ of the annular projections $c$ formed by the grooves $e$ are made as sharp as practicable, in order that when spaces are produced by slightly lifting the plug, there will be considerable friction as the milk or cream passes them. The plug 5 has a stem 7 which extends through a suitable packing box 9 in the bonnet.

10 is a screw bolt in the cross bar 4 terminating in a collar 12. The collar and screw are bored to receive the upper end of the stem 7 which fits loosely therein. On the stem 7 is a collar 13 similar to the collar 12 on the screw 10; and between the two collars, and around the stem 7 is placed a coiled spring 15 which is under tension.

The strength of the coiled spring when compressed by the screw 10 is such that the milk or cream when forced into the apparatus will cause the plug to lift slightly and disclose a multiplicity of minute annular apertures around its projections $c$ through which the material will pass; and in the operation, the globules of butter fat are broken up; and by the time the material has passed through all the apertures it will escape by means of the discharge nozzle 6 in the condition of a uniform or homogeneous emulsion.

It will be seen that with the construction described the portion of the shell above the plug, is practicably under no internal pressure, and that when ordinary care is exercised in packing the box in the bonnet, there will be no leakage.

The ultimate result sought to be accomplished by means of the apparatus as described, and the advantages of the process involved, are so well known in the art as to render any explanation herein superfluous.

In Fig. 1 the central or inner portion of the plug is shown as strictly conical, while in Fig. 3 this is not the case, the bottom of the grooves $e^1$ being rounded, but as in both cases the liquid has to pass sharp annular edges it is not thought that there will be any difference in the operation of the apparatus, or the condition of the product thereby produced.

We claim as our invention:

1. In an emulsifying apparatus, a shell having a conical inner surface and provided with an inlet and an outlet nozzle, combined with a plug having a similar conical outer surface and an acute annular edge, adapted to fit the inner surface of the shell, and serve as means to close communication between the two nozzles, and an appliance to yieldingly hold the plug with its acute annular edge in contact with the shell, substantially as specified.

2. In an emulsifying apparatus, a shell having a conical inner surface, and provided with an inlet and an outlet nozzle, combined with a plug having a conical outer surface adapted to closely fit the inner surface of the shell, and provided with annular grooves, and means to yieldingly hold the projections of the plug produced by the said grooves in contact with the inner surface of the shell, substantially as specified.

3. In an emulsifying apparatus, a shell having a conical inner surface and provided with an inlet and an outlet nozzle, combined with a conical plug having annular grooves therein, adapted to closely fit the inner surface of the shell, and a spring which acts on the plug to hold the projections of the plug produced by the said grooves yieldingly in contact with the inner surface of the shell, substantially as specified.

ASA B. GARDINER, Jr.
RICHARD M. SHAFFER.

Witnesses:
Jos. H. Thomas,
Wm. T. Howard.